United States Patent
Holopainen et al.

[19]

[11] Patent Number: 6,129,453
[45] Date of Patent: Oct. 10, 2000

[54] HYDROSTATIC GLIDE BEARING FOR A ROLL OR EQUIVALENT

[75] Inventors: Kari Holopainen; Pekka Kivioja, both of Muurame; Vesa Nokelainen, Haapaniemi, all of Finland

[73] Assignee: Valmet Corporation, Finland

[21] Appl. No.: 09/171,165

[22] PCT Filed: Jan. 28, 1998

[86] PCT No.: PCT/FI98/00086

§ 371 Date: Oct. 14, 1998

§ 102(e) Date: Oct. 14, 1998

[87] PCT Pub. No.: WO98/36184

PCT Pub. Date: Aug. 20, 1998

[30] Foreign Application Priority Data

Feb. 14, 1997 [FI] Finland ..................... 970624

[51] Int. Cl.[7] .................................................. F16C 32/06
[52] U.S. Cl. ................................. 384/116; 384/100
[58] Field of Search .............................. 384/116, 117, 384/114, 100

[56] References Cited

U.S. PATENT DOCUMENTS

| 3,422,650 | 1/1969 | Strance ...................................... 384/114 |
| 3,891,281 | 6/1975 | Jenness . | |
| 3,909,080 | 9/1975 | Hallnor et al. ............................. 384/116 |
| 4,041,752 | 8/1977 | Dolenc et al. ................................. 72/201 |
| 4,530,227 | 7/1985 | Schlatter et al. .......................... 72/241.6 |
| 4,704,879 | 11/1987 | Christ et al. ................................ 68/140 |
| 5,382,096 | 1/1995 | Stein et al. ............................... 384/116 |

FOREIGN PATENT DOCUMENTS

| 0158051 | 4/1988 | European Pat. Off. . |
| 1382268 | 11/1964 | France . |
| 2010628 | 10/1971 | Germany . |
| 2515061 | 10/1975 | Germany . |
| 4319579 | 12/1994 | Germany . |
| 373417 | 5/1972 | Sweden . |
| 1558490 | 1/1980 | United Kingdom . |

*Primary Examiner*—Thomas R. Hannon
*Attorney, Agent, or Firm*—Steinberg & Raskin, P.C.

[57] ABSTRACT

A glide bearing for a roll having hydrostatic bearing elements provided with bearing shoes fitted to be positioned around a neck of the roll axle in order to support the axle and thus the roll revolvingly with respect to a frame member, such as a bearing block. The bearing elements are hydraulically-operating piston-cylinder devices which may be loaded by a hydraulic pressure medium such that the bearing shoes are able to be positioned freely around the neck of the axle. In one preferred application, the bearing elements are arranged so as to enable displacement of the roll for closing and opening a nip formed in part by the roll.

21 Claims, 4 Drawing Sheets

HYDROSTATIC GLIDE BEARING FOR A ROLL OR EQUIVALENT

FIELD OF THE INVENTION

The invention relates to a glide bearing for a roll, which glide bearing comprises several hydrostatic bearing elements which are provided with bearing shoes fitted to be positioned around the neck of a roll axle in order to support said axle and, thus, the roll revolvingly with respect to a frame member, such as a bearing block.

BACKGROUND OF THE INVENTION

Until now, rolls in paper machines and in paper finishing devices except for rolls in which the mantle of the roll is able to move with respect to the axle of the roll, have ordinarily been journalled by means of roller bearings on frame structures of the machine. In particular, in connection with rolls forming a nip, such as calender rolls and soft calender rolls, such roller bearings have caused certain problems, whose solution has required special arrangements. In some cases, it would be desirable to operate soft calenders in particular at linear loads that produce a very small load, even the so-called zero load on roller bearings. This is very problematic in the case of roller bearings because, in the zero load situation, the rolling members of the roller bearing are able to glide considerably with respect to bearing races instead of rolling, with the result that the bearing breaks rather quickly. Heatable rolls, calender rolls in particular, also involve the problem that succeeding in lubrication is a fairly critical factor. In connection with roller bearings, it has been necessary also for this reason to employ special arrangements. Roller bearings additionally involve a vibration problem. The roller bearings in themselves do not have any property that in itself could attenuate such vibration. The structure of the bearing alone sets a certain limit for the speed of rotation, which limit is not permitted by the bearing manufacturer to be exceeded. As already previously mentioned, the rolling accuracy of the bearing is limited. Although all the components in a conventional roll were manufactured as precisely as possible, the defects caused by inaccuracies are summed up in an assembled roll.

Presses also make special demands on journalling of rolls. From the point of view of journalling, extended-nip presses in particular are troublesome because the radial forces acting on bearings in this kind of construction are very high. Special problems of their own are also caused by centre rolls of a press section for the reason that the centre roll generally forms two nips with backup rolls such that the directions of nip planes differ substantially from each other. In that case, it is difficult to determine any actual principal loading direction.

With regard to prior art relating to the journalling with glide bearings, reference is made, for instance, to EP Patent 158 051 which relates to the journalling of a washing drum. The journalling in this arrangement has been provided with glide bearings by means of hydrostatic bearing segments. The mode of journalling in accordance with this publication cannot, however, be used, for instance, in calender rolls that are in nip contact, because the mode of journalling described in this EP publication does not comprise any possibility of radial movement in the bearing itself. Also, the loading of the bearing cannot be changed in any way, and separate spring elements are needed for attenuating vibrations. With respect to prior art, reference is made further to FI Patent application No. 942756 which discloses a bearing for a heated roll. This mode of journalling also involves the drawback that there exists no possibility of radial displacement, because at least one hydrostatic bearing segment of the glide bearing arrangement is, in the radial direction, completely fixed and stationary with respect to a frame structure, and, thus, it is not possible to displace the roll carried by means of said bearing, for instance, in the direction of the nip plane.

OBJECTS AND SUMMARY OF THE INVENTION

The object of the present invention is to provide a novel arrangement for a roll or equivalent for journalling it with glide bearings, by means of which the drawbacks involved in the journalling with roller bearings are avoided, and which additionally provides a significant improvement over the already existing arrangements for journalling by means of glide bearings. With a view to achieving the objective of the invention, the invention is mainly characterized in that the bearing elements are hydraulically operating piston-cylinder devices which can be loaded by means of a pressure medium so that the bearing shoes of the bearing elements are able to be positioned freely around a neck of an axle.

The invention provides a significant advantage over prior art arrangements, and of these advantages, among other things, the following may be mentioned. The journalling system is not directly in contact with a frame in the principal loading direction, in the direction of the nip plane in particular, but it can be loaded hydraulically by means of the device of the piston-cylinder type towards the axle. This enables the roll to be displaced and moved in said principal loading direction. Further, in the case of nip rolls, it enables the nip load to be regulated accurately and the nip load to be measured without special arrangements. The hydrostatic bearing shoes included in the journalling system are positioned totally freely around the neck of the roll axle, so that e.g. increase in the diameter of the axle caused by heating up of the axle does not create any problem, nor does the inclination resulting from bending of the axle nor do other faults in position. The journalling system may be used intentionally, for instance, for closing and opening a roll nip because all hydrostatic bearing shoes are movable. The nip load can be calculated directly from the oil pressures of the bearing shoes because said shoes provide loading of the roll nip. The journalling arrangement is in itself receiving and attenuating vibrations. The further advantages and characteristic features of the invention will become apparent from the following detailed description of the invention.

BRIEF DESCRIPTION OF THE DRAWINGS

In the following, the invention will be described by way of example with reference to the figures in the accompanying drawing.

DETAILED DESCRIPTION OF THE PREFERRED EMBODIMENTS

Figure 1:
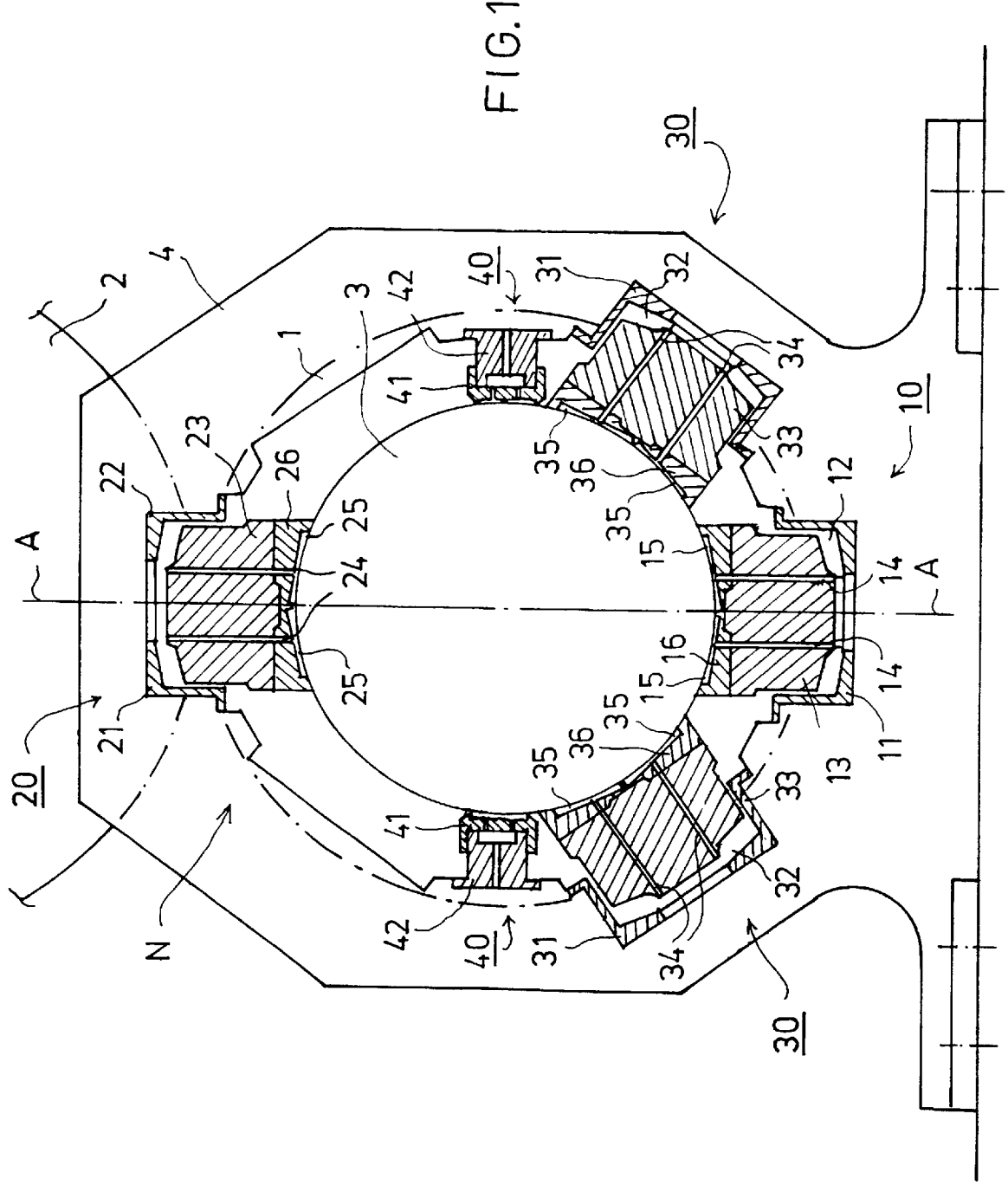
FIG. 1 is a schematic and partly sectional side view of a glide bearing on one side of a roll.

FIG. 1 of the drawing thus shows fully schematically one embodiment of the glide bearing in accordance with the invention as applied to supporting of a roll, which roll forms a nip with a backup roll. The roll itself has been illustrated with a line of dots and dashes and denoted with the reference numeral 1, and the axle of the roll is denoted with the reference numeral 3. The reference numeral 2 denotes the backup roll which forms a nip N with the roll 1, which nip is, for instance, a calendering nip. The nip plane is denoted by the reference sign A—A. Although it is not separately shown in FIG. 1, it shall be understood that, in the journalling of the roll 1, the journalling of at least one end of the roll must comprise an axial bearing receiving axial loads because the glide bearing arrangement in accordance with the invention is intended to serve mainly merely as a radial bearing of the roll.

The glide bearing arrangement in accordance with the invention shown in FIG. 1 comprises bearing elements 10,20,30,40 which are mounted in a bearing block 4 and which rest against the axle 3 of the roll. The journalling arrangement comprises a main bearing 10,30 which acts in the main loading direction, i.e. in the direction of the nip plane A—A, and which is loaded towards the nip N, a counter-bearing 20 acting in an opposite direction, and side bearings 40 acting in opposite directions in a direction transverse to the nip plane A—A. In the embodiment shown in FIG. 1, the main bearing is divided into three parts such that it comprises a first bearing element 10 acting in the nip plane and, in addition to this, second bearing elements 30 arranged at an angle and situated symmetrically with respect to the nip plane. The arrangement of the bearing elements on the axle of the roll and, for instance, the "symmetricalness" of the elements may, however, even substantially differ from the illustration of FIG. 1 according to each particular application, as shown, for instance, hereafter in connection with FIGS. 2–4. The arrangement of the bearing elements shown in FIG. 1 is only one embodiment which is primarily intended for a construction in which the roll 1 provided with said bearings each time forms only one nip with the backup roll. This is the case, for instance, in a soft calender comprising two rolls. However, it is not desired to exclude the possibility that this kind of journalling is also employed in another connection, as is attempted to he illustrated, for instance, by means of FIG. 2.

In the illustration of FIG. 1, the first bearing element 10 and the second bearing elements 30 may be in structure similar to one another such that they comprise a cylinder 11,31 fitted in the bearing block 4, a loading piston 13,33 being movably disposed in said cylinder. A pressure space 12,32 is formed in the cylinder 11,31 under the loading piston 13,33, and by passing a pressure medium into said pressure space, the loading piston 13,33 is caused to be loaded towards the axle 3. A bearing shoe 16,36 is attached to that end of the loading piston 13,33 which is on the side of the axle 3, and lubricating oil pockets 15,35 opening towards the axle 3 are formed in said bearing shoe. The loading piston 13,33 is provided with capillary through bores 14,34, which thus connect the pressure space 12,32 of the cylinder with the lubricating oil pockets 15,35 of the bearing shoe. The pressure medium is thus able to enter the lubricating oil pockets 15,35 through the capillary bores 14,34 so that an oil film is formed between the bearing shoe 16,36 and the axle 3, the bearing shoe 16,36 being supported against the axle 3 through said oil film.

The counter-bearing 20 is in structure similar to the bearing elements 10, 30 of the main bearing such that the counter-bearing element 20 comprises a cylinder 21 fitted in the bearing block 4 and a loading piston 23 movably disposed in the cylinder. The loading piston 23 further comprises a bearing shoe 26 which is provided with lubricating oil pockets 25. The bearing shoe 26 is provided with capillary bores 24, along which oil from a pressure space 22 situated under the loading piston 23 can enter lubricating oil pockets 25 to form an oil film between the bearing shoe 26 and the neck of the axle 3. As shown in FIG. 1, the counter-bearing element 20 is mounted in the nip plane A—A such that its direction of action is parallel to the nip plane but opposite to the direction of action of the main bearing.

FIG. 1 further shows that the axle 3 is supported by means of bearings acting in a direction transverse to the nip plane A—A, i.e. by means of side bearings 40. In the illustration of the figure, the side bearings 40 comprise a frame part 42 fitted in the bearing block 4 and a bearing shoe 41 disposed on support of the frame part. The bearing shoes 41 are loaded by means of hydraulic fluid against the axle 3 of the roll. The actual purpose of the side bearings 40 is only to maintain the axle 3 in its proper position and to attenuate vibrations in a transverse direction.

In the arrangement shown in FIG. 1 in accordance with the invention, the loading of the roll nip N is produced by means of the bearing elements 10,30 of the main bearing. Owing to this, the nip load can be calculated directly from the oil pressures of the bearing elements 10,30. Thus, precise regulation of the nip load can be accomplished by fairly simple steps in the arrangement in accordance with the invention. In the arrangement shown in FIG. 1, the main bearing is divided into three separate bearing elements 10,30, because of which the bearing can provide when needed, fairly high loading forces. In present-day soft calenders, in many cases, it must be possible to apply in linear load a range that corresponds to the zero load of the bearing. It is rather difficult to accomplish this by means of conventional journalling arrangements so that the bearings would not break. In the arrangement in accordance with the invention and shown in FIG. 1, the zero load situation does not pose any problem, since the adjustment of loading to the zero loading situation is easy to accomplish and to provide by means of the main bearing 10,30 and the counter-bearing element 20. As already previously stated, in the principal loading direction, i.e. in the direction of the nip plane A—A, the bearing elements 10,20,30 are not fixedly secured with respect to the bearing block 4, but each of the bearing elements is movable. Because of this, vibrations can be effectively attenuated. Further, because of this characteristic feature and especially as the play of the bearing elements is dimensioned to be sufficiently large, opening and closing of the nip N may be taken care of by means of the bearing elements. For example, in connection with soft calenders, the bearing element may then also be used for quick-opening of the set of rolls.

The glide bearing arrangement shown in FIG. 1 is also suitable for use in rolls that are loaded from outside by two nips which have a common nip plane, i.e. in which the nips are in the same plane. Such applications are in certain types of calenders and presses. In that case there may be several rolls in a common nip plane (e.g. supercalenders, and machine and soft calenders comprising many nips). If such an arrangement were desired to be illustrated by means of FIG. 1, it might be done most simply by adding a second nip roll underneath the roll 1, the nip formed by said nip roll with the roll 1 being in the same nip plane with the nip N between the backup roll 2 and the roll 1.

Figure 2:
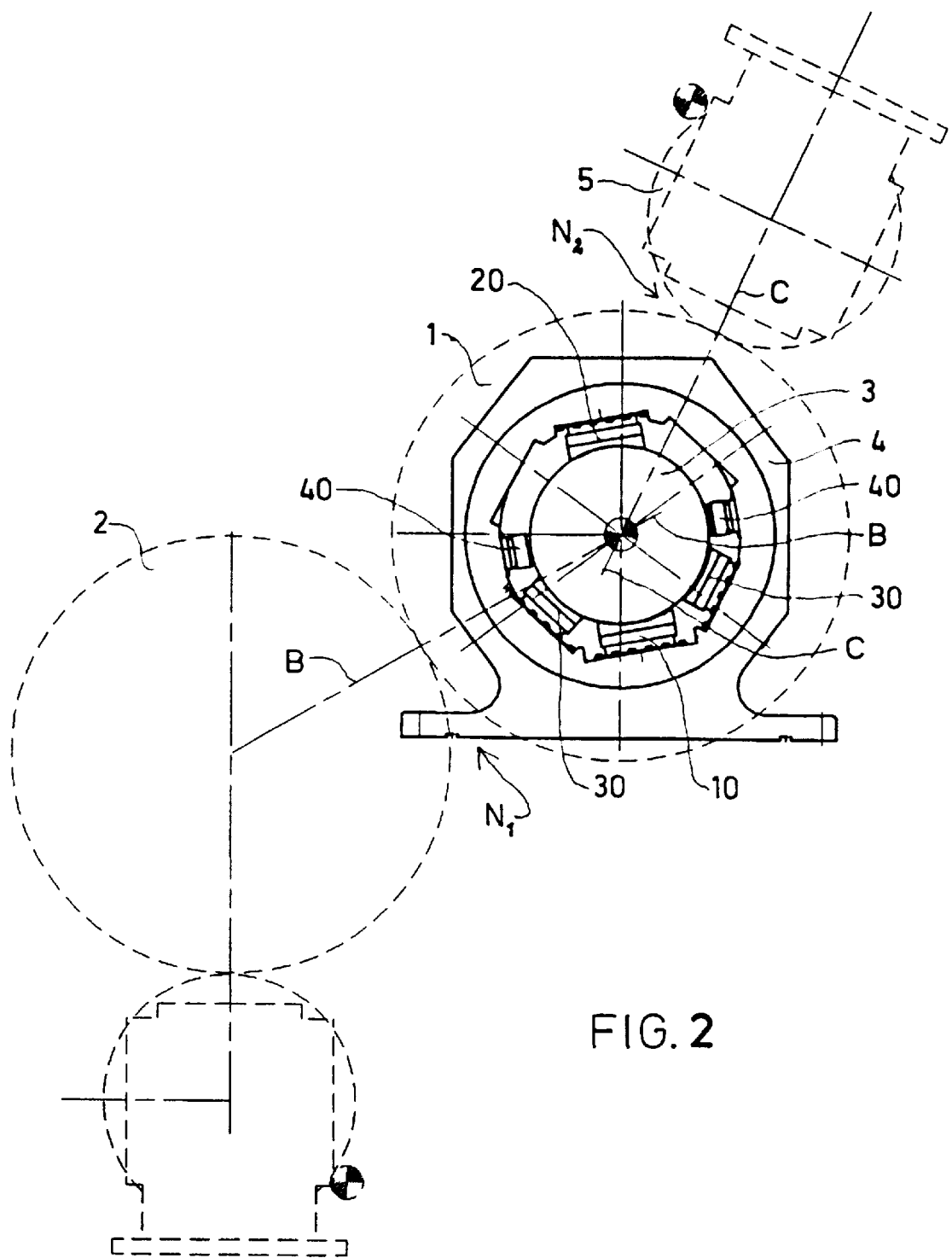
FIG. 2 schematically shows the application of the glide bearing shown in FIG. 1 to journalling of a centre roll of a press.

FIG. 2 schematically shows the application of a glide bearing arrangement to a centre roll of a press, which roll is denoted with the reference numeral 1 in FIG. 2. The centre roll 1 forms press nips $N_1, N_2$ (two nips) with backup rolls 2 and 5 such that said nips $N_1, N_2$ are not situated in a common nip plane. but nip planes B—B and C—C form an angle with each other. Consequently, the centre roll 1 and thus its bearings are subjected to substantial loads in two different directions, with the result that there exists no actual principal loading direction for the roll. If it were desirable to determine the principal loading direction of the centre roll 1 and of its bearings in particular, as the principal loading direction could be regarded the direction which consists of the direction of a resultant force of the forces acting in the direction of the nip planes B—B and C—C and of the load caused by the weight of the centre roll 1 itself. In that case, the bearing elements 10,20,30,40 have to be grouped so that they receive the applied loads in the best possible way. In the arrangement of FIG. 2, the grouping of the bearing elements corresponds to that described in more detail in FIG. 1, however, differing from it such that the main bearing elements 10,30 and the counter-bearing elements 20 do not act in the direction of either of the nip planes B—B, C—C nor in the direction of the vertical plane, but, instead, the bearing element 10,20,30,40 groups are placed around the neck of the axle 3 in a position required by the "imaginary principal loading direction".

Figure 3:
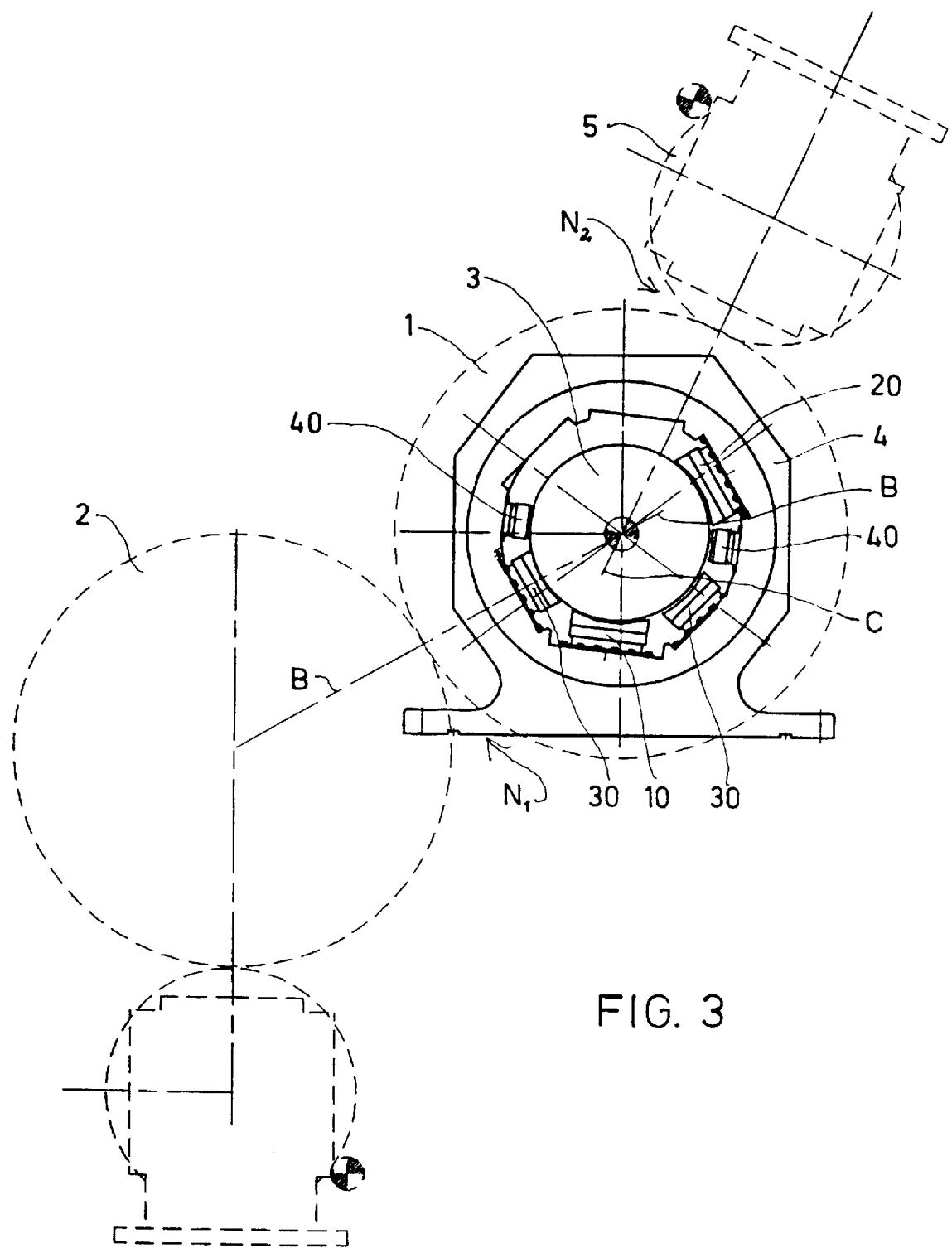
FIG. 3 shows, in a way corresponding to that of FIG. 2, a glide bearing modified from the illustration of FIG. 1 as a bearing of a centre roll of a press.

The arrangement shown in FIG. 3 corresponds to the application of the glide bearing arrangement shown in FIG. 2 to a centre roll of a press, which roll is denoted with the reference numeral 1 in FIG. 3 too. The centre roll 1 forms press nips $N_1, N_2$ (two nips) with backup rolls 2 and 5 so that said nips $N_1, N_2$ are not situated in a common nip plane, but nip planes B—B and C—C form an angle with each other. Consequently, the centre roll 1 and thus its bearings are subjected to substantial loads in two different directions, with the result that there exists no actual principal loading direction for the roll in the arrangement of FIG. 3, either. However, the grouping of the glide bearing elements 10,20, 30,40 differs from that of FIG. 2, firstly, so that the so-called counter-bearing element 20 does not act in a direction opposite to the imaginary resultant force of the "main bearing elements" 10,30, and, secondly, so that the groups of the bearing elements are placed around the neck of the axle 3 in a position different from that of FIG. 2. In FIG. 3, the "counter-bearing element" 20 is arranged almost in the nip plane B—B of the first nip $N_1$, and thus said counter-bearing element 20 substantially receives the forces directed to the centre roll 1 in the direction of the first nip plane B—B. The "main bearing elements" 10,30 are in turn arranged so that they receive the load caused by the weight of the centre roll 1 itself as well as the load directed to the bearings through the second nip $N_2$ in the direction of the second nip plane C—C. The most appropriate grouping of the bearing elements 10,20,30,40 depends, as already previously stated, on the forces acting on the bearings of the centre roll 1 in the directions of the nip planes B—B, C—C and on the effect of the weight of the centre roll 1 itself.

Figure 4:
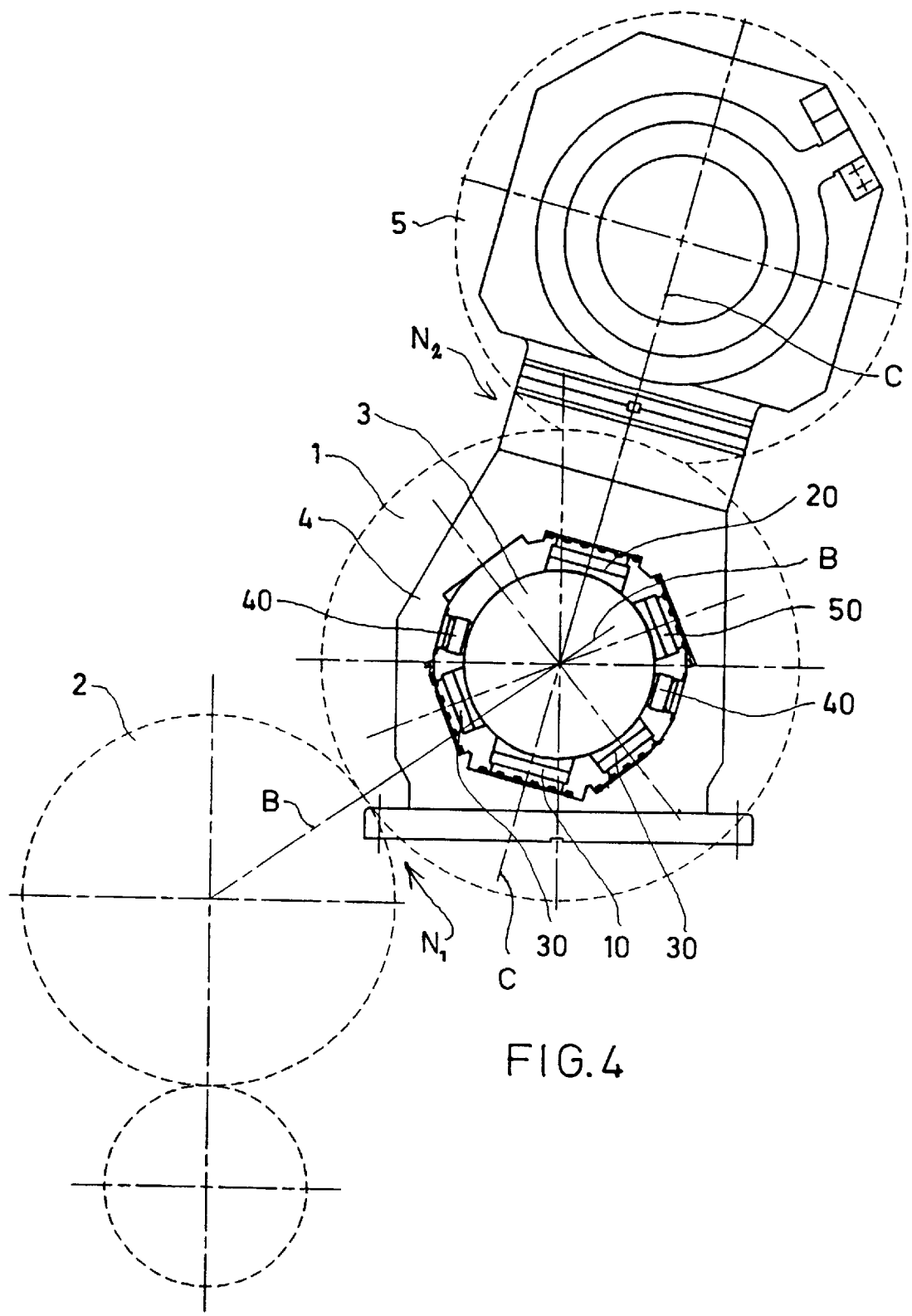
FIG. 4 shows the application of a glide bearing to journalling of a centre roll of a press in which one backup roll of the centre roll is an extended-nip roll.

Finally, FIG. 4 shows, in a way corresponding to FIGS. 2 and 3, the application of a glide bearing arrangement to journalling of a centre roll 1 of a press, however, differing from said figures in such a way that, in the illustration of FIG. 4, the first nip $N_1$ is formed between the centre roll 1 and a first backup roll 2 in a way corresponding to FIGS. 2 and 3, but the second nip $N_2$ of the press is an extended nip which is formed between the centre roll 1 and a belt mantle roll 5 provided as a second backup roll. The directions of nip planes B—B, C—C differ substantially from each other in the embodiment of FIG. 4 too. As was already previously mentioned in connection with prior art, an extended nip causes problems of its own in journalling of a roll especially for the reason that both of the rolls forming such an extended nip are subjected to very high forces from the nip. In the arrangement of FIG. 4, this has been taken into account such that the main bearing elements 10,30 in the journalling of the centre roll 1 are arranged to act in the nip plane C—C of the extended nip $N_2$ between the centre roll 1 and the belt mantle roll 5. Similarly, a counter-bearing element 20 is also mounted to act in a direction opposite to said second nip plane C—C with respect to the main bearing elements 10,30. In addition to the main bearing elements 10,30 and the counter-bearing element 20, the journalling system in the embodiment of FIG. 4 is provided further with an additional element 50 which is arranged to act almost in the direction of the first nip plane B—B so that said additional bearing element 50 substantially receives together with the counter-bearing element 20 the load directed to the bearings from the first nip $N_1$.

A feature common to the journalling arrangements for the centre roll 1 of the press shown in FIGS. 2–4 and differing from the arrangement shown in FIG. 1, intended for journalling a calender roll in particular, is that in the centre roll application the journalling arrangement is intended only for journalling of the roll, and the nips are not intended to be opened and closed by means of the bearing elements, but the opening and the closing are intended to be taken care of by other more conventional means. It would indeed be difficult to accomplish the opening and the closing of the nips in the arrangements shown in FIGS. 2–4 because the centre roll forms two nips while the nip planes pass substantially across each other.

Above, the invention has been described by way of example with reference to the figures in the accompanying drawing. The invention is, however, not confined to relating only to the examples illustrated in the figures, but different embodiments of the invention may vary within the scope of the inventive idea defined in the accompanying claims.

What is claimed is:

1. A glide bearing for a roll, which glide bearing comprises several hydrostatic bearing elements (10,20,30,40) which are provided with bearing shoes (16,26,36,41) fitted to be positioned around the neck of a roll (1) axle (3) in order to support said axle (3) and, thus, the roll (1) revolvingly with respect to a frame member, such as a bearing block (4), characterized in that the bearing elements (10,20,30,40) are hydraulically operating piston-cylinder devices which can he loaded by means of a pressure medium so that the bearing shoes (16,26,36,41) of the bearing elements are able to be positioned freely around the neck of the axle (3).

2. A glide bearing as claimed in claim 1, characterized in that at least in the principal loading direction of the roll, and in the case of a nip roll in the direction of a nip plane (A—A), the roll (1) can be displaced by means of bearing elements (10,20,30), especially for the purpose of closing and opening the nip (N).

3. A glide bearing as claimed in claim 2, characterized in that the loading pressure of the roll nip (N) is arranged to be produced by means of bearing elements (10,30) acting in the direction of the nip plane (A—A).

4. A glide bearing as claimed in claim 2, characterized in that the loading of the roll nip (N) can be determined directly from the pressure of a hydraulic medium of the bearing elements (10,20,30) acting in the direction of the nip plane (A—A) and regulated according to it to a desired level.

5. A glide bearing as claimed in claim 2, characterized in that the bearing elements (10,30) constituting the main bearing of the roll comprise several bearing elements (10,30)

placed around the periphery of the axle (3), the resultant of the forces produced by said bearing elements being opposite in direction to the resultant of the force directed to the bearings from the roll nip (N) in the direction of the nip plane (A—A) and of the force directed to the bearings from the weight of the roll (1).

6. A glide bearing as claimed in claim 5, characterized in that the main bearing comprises three bearing elements (10,30), of which one bearing element (10) is arranged to act directly in the direction of the resultant force and the other two bearing elements (30) symmetrically with respect to said bearing element (10).

7. A glide bearing as claimed in claim 1, characterized in that the glide bearing is arranged for journalling of a calender or press roll which roll (1) is loaded from outside radially from two directions through roll nips, the nip planes of which roll nips substantially coincide.

8. A glide bearing as claimed in claim 7, characterized in that one of the nips producing an external load on the roll (1) is an extended nip ($N_2$) provided by means of a belt mantle roll (5), most of the bearing elements (10,20,30) of the glide bearing being arranged to act in the direction of the nip plane (C—C) of said extended nip ($N_2$).

9. A glide bearing as claimed in claim 1, characterized in that the glide bearing is arranged for journalling of a centre roll or an equivalent roll (1) of a press, which roll (1) is loaded from outside radially from at least two different directions through roll nips ($N_1,N_2$), the directions of whose nip planes (B—B, C—C) pass across and intersect each other, the bearing elements (10,20,30,40,50) being arranged and grouped on the neck of the axle (3) so that they receive the loads coming from the directions of the nip planes (B—B, C—C) and compensate for the load directed to the bearings from the weight of the roll (1).

10. An arrangement for supporting an axle of a roll, comprising a stationary frame member, and a glide bearing comprising hydrostatic bearing elements mounted in said frame member, each of said bearing elements including a bearing shoe positioned around a portion of the axle for supporting the axle by the intermediate of a pressure medium such that the roll is revolvable with respect to said frame member and to said bearing shoes, said bearing elements being hydraulically operating piston-cylinder devices loadable by the pressure medium.

11. The arrangement of claim 10, wherein said frame member is a bearing block.

12. The arrangement of claim 10, wherein at least one of said bearing elements is arranged such that said bearing shoe of said at least one bearing elements applies a force to the axle to displace the roll at least in a principal loading direction of the roll.

13. The arrangement of claim 10, wherein said bearing elements comprises a main bearing composed of several of said bearing elements arranged to provide a resultant force to the axle in a principal loading direction of the roll.

14. The arrangement of claim 13, wherein said main bearing comprises three bearing elements, a first one of said three bearing elements being arranged to apply a force to the axle directly in the principal loading direction and a second and third one of said three bearing elements being arranged symmetrically with respect to said first bearing element.

15. The arrangement of claim 10, wherein each of said piston-cylinder devices comprises a cylinder arranged in said frame member and a piston movable in an interior of said cylinder, said piston being spaced from cylinder to define a space therebetween, said piston including bores in flow communication with said space, said bearing shoe defining at least one pocket in flow communications with said bores and situated against the axle.

16. A press nip arrangement, comprising a first roll having an axle, stationary frame members for supporting said axle of said first roll, a glide bearing comprising hydrostatic bearing elements mounted in each of said frame members, each of said bearing elements including a bearing shoe positioned around a portion of a neck of said axle for supporting said axle by the intermediate of a pressure medium such that said first roll is revolvable with respect to said frame member and to said bearing shoes, said bearing elements being hydraulically operating piston-cylinder devices loadable by the pressure medium, and a second roll arranged to define a first nip with said first roll.

17. The arrangement of claim 16, wherein at least some of said bearing elements are arranged to apply a force to the axle in a direction in a first nip plane defined as a plane extending between a centerpoint of said first roll and a centerpoint of said second roll.

18. The arrangement of claim 17, wherein loading of said first nip is determined directly from the pressure of the pressure medium of said bearing elements arranged to apply a force to the axle in the first nip plane and regulated according to a desired level.

19. The arrangement of claim 17, wherein said bearing elements comprises a main bearing composed of several of said bearing elements arranged to provide a resultant force to the axle in a principal loading direction in the first nip plane which is opposite in direction to a resultant of the force directed to said main bearing from said first nip and a force directed to said main bearing from the weight of said first roll.

20. The arrangement of claim 17, further comprising a third roll defining a second nip with said first roll, a second nip plane being defined between a centerpoint of said third roll and the centerpoint of said first roll, said first, second and third rolls being arranged such that said first and second nip planes intersect one another.

21. The arrangement of claim 20, wherein said second roll is an extended nip roll including a belt mantle.

* * * * *